United States Patent [19]

Flower

[11] Patent Number: 4,526,387
[45] Date of Patent: Jul. 2, 1985

[54] ROTATABLE SHAFT SEALS

[75] Inventor: Ralph F. J. Flower, Bath, England

[73] Assignee: Cross Manufacturing Company (1938) Limited, England

[21] Appl. No.: 572,516

[22] Filed: Jan. 20, 1984

[30] Foreign Application Priority Data

Jan. 28, 1983 [GB] United Kingdom ............... 8302450

[51] Int. Cl.³ ............................................. F16J 9/00
[52] U.S. Cl. ..................................... 277/198; 277/193
[58] Field of Search ............................. 277/193, 198

[56] References Cited

U.S. PATENT DOCUMENTS

| 2,466,428 | 4/1949 | Hufferd et al. | 277/198 |
| 3,658,350 | 4/1972 | Ondraka | 277/198 |
| 3,877,707 | 4/1975 | Syvakari | 277/198 |
| 4,161,317 | 7/1979 | Sakamaki | 277/198 |

Primary Examiner—Robert I. Smith
Attorney, Agent, or Firm—McGlew and Tuttle

[57] ABSTRACT

A seal assembly for a rotatable shaft extending through a bore in a housing, particularly for high-speed applications such as turbo-charger rotors. An annular groove is provided around the shaft, and a first resilient split-ring sealing member is located in the groove. At least one second resilient split-ring sealing member is fitted over said first member, so as resiliently to bear on the wall of the housing defining the bore. Said first member is an axial close running fit within the groove, but of a lesser radial dimension than the depth of groove, whereas the axial width of said second member is smaller than that of said first member.

6 Claims, 4 Drawing Figures

ROTATABLE SHAFT SEALS

BACKGROUND OF THE INVENTION (a) Field of the Invention

This invention relates to a seal assembly for a rotatable shaft extending through a bore in a housing, which assembly is adapted to minimise the leakage of fluid through the bore, between the shaft and the housing. Although the seal assembly of this invention is applicable generally as a seal for a shaft rotatable within a bore in a housing, it has particular utility as a seal assembly for sealing the shaft of a turbo-charger rotor and the invention will hereinafter be described by way of example with reference to such apparatus.

(b) Description of the Prior Art

A known form of seal assembly for a shaft extending through a bore in a housing and rotatable with respect thereto, to effect a fluid seal between the shaft and the housing, comprises an annular groove formed in the shaft in the region thereof within the bore and an annular sealing member located in the groove in the shaft and bearing against the housing wall defining the bore. The sealing member may be metallic and have a radial gap at one point on the circumference thereof, whereby the ring may be expanded and contracted circumferentially to a limited extent. The 'natural' or free diameter of such a ring should be slightly greater than the bore diameter, whereby the ring, when located in the groove and lying within the bore, is contracted circumferentially to a small extent, such that the ring may bear resiliently on the wall defining the bore. Such a sealing member for use in the just-described kind of seal assembly is referred to hereinafter as a "split-ring sealing member".

A seal assembly including a split-ring sealing member often is used to form a seal between a rotatable shaft and a housing therefor particularly where the shaft is to turn at a relatively high rate and hence to have a relatively high surface speed, which will preclude the use of a non-metallic resilient seal assembly, for example using a natural or synthetic rubber seal element. An example of such an application is in the case of the sealing of the rotor shaft of a turbo-charger, but due to the clearances necessary to permit the shaft to rotate and also those arising as a result of wear, the leakage of fluid—such as lubricating oil—often occurs through a seal assembly using a split-ring sealing member, particularly when the shaft is stationary.

OBJECTS OF THE INVENTION

It is a general object of this invention to provide an improved seal assembly employing a split-ring sealing member, in an attempt to provide better sealing characteristics, so reducing leakage through the seal assembly.

A further object of the invention is to provide a seal assembly which is particularly suitable for sealing a shaft which is to rotate at relatively high rates, such as a turbo-charger shaft.

Other objects and advantages of the invention will become apparent from the following description thereof.

SUMMARY OF THE INVENTION

In accordance with the present invention, there is provided a seal assembly for a shaft extending through and rotatable within a bore in a housing, which sealing assembly comprises an annular groove formed around a part of the shaft which lies within the bore in the housing, a first split-ring sealing member (as defined herein) located within the groove, and at least one second split-ring sealing member located at least partially within the groove so as to overlie and be engaged by said first split-ring sealing member, the or each second split-ring sealing member also bearing against the wall of the bore defined by the housing to effect a seal thereagainst.

This invention further extends to the combination of a housing having a bore, a shaft extending through the bore and mounted for rotation therewithin, and a seal assembly of this invention as defined above provided within the bore. The shaft and housing combination may comprise the shaft of a turbo-charger rotor and the casing therefor, respectively.

BRIEF DESCRIPTION OF THE DRAWINGS

The invention will now be discussed in greater detail, and specific embodiments thereof described, referring as necessary to the accompanying drawings. In the drawings.

DESCRIPTION OF THE PREFERRED EMBODIMENTS

Figure 1:
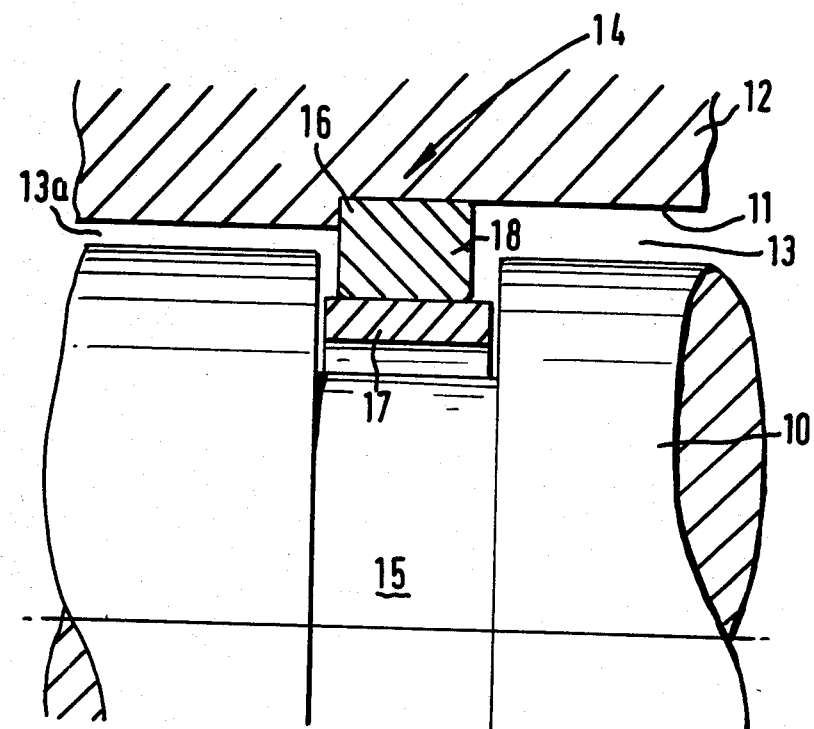
FIG. 1 is a fragmentary longitudinal section of a part and of the rotor shaft and housing of a turbo-charger, showing a seal assembly arranged in accordance with this invention.

In the seal assembly of this invention, one or more of the split-ring sealing members may have a simple radial gap, but it is preferred for at least one of the split-ring sealing members to be of the step-gap type, in which a portion of the end of the ring to one side of the gap lies axially alongside a portion of the end of the ring to the other side of the gap. Advantageously to enhance the sealing characteristics of the seal assembly, two or even more second split-ring sealing members may be provided, in an axially side-by-side disposition and each being engaged by said first split-ring sealing member.

Preferably, the first split-ring sealing member has a greater axial width than the width of the second split-ring sealing member, or of the total axial width of all of the second split-ring sealing members when disposed side-by-side for a case where more than such second split-ring sealing member is provided. The first split-ring sealing member should however be a free running fit in the groove, such that the first sealing member does not turn with the shaft but instead is maintained stationary by virtue of its engagement with the second split-ring sealing member. The clearances on the sides of the first split-ring sealing member, relative to the walls of the groove, should be maintained at a minimum, so as to give a minimum leakage, and to allow the ring to follow minor axial perturbations of the shaft.

The provision of two split-ring sealing members allows there to be sufficient axial clearance in the shaft groove for the second split-ring sealing member to allow working 'float' and to accommodate wear after an initial 'running in' period, whilst still permitting an excellent seal to be achieved, because the first split-ring sealing member serves to effect a seal between the second split-ring sealing member and the shaft. Because the first split-ring sealing member only has to bear resiliently on inner diameter of the second split-ring sealing member and effect a seal against the walls of the groove, the first split-ring sealing member may have a lesser radial width than the or each second split-ring sealing member.

Specific embodiments of this invention, incorporating various of the preferred features as discussed above, will now be described, referring to the drawings.

FIG. 1 shows a turbo-charger rotor shaft 10 mounted for rotation and extending with clearance through a bore 11 provided in a housing 12 of the turbo-charger, with clearances 13 and 13a between the shaft and the housing on the respective sides of the seal assembly 14 of this invention provided within the bore 11. The clearance 13a is preferably smaller than the clearance 13 and is the side of the assembly presented to lubricant used for the rotor bearing; this clearance 13a advantageously is therefore the minimum effective running clearance for the shaft within its housing, so as to provide a minimum leakage path for the lubricating oil.

The seal assembly of this invention comprises an annular groove 15 formed around a portion of the shaft 10 which when assembled with the housing 12 lies wholly within the housing, adjacent a step 16 in the bore in the housing. The seal assembly further comprises a first split-ring sealing member 17 located wholly within the groove 15 and a second split-ring sealing member 18, lying partially within the groove 15 in the shaft but also engaging the step 16 of the bore 11. Both split-ring sealing members are metallic and have resilient properties, such that the second split-ring sealing member 18 bears against the wall of the housing defining the bore 11, and the first split-ring sealing member bears on the inner diameter of the second split-ring sealing member.

As mentioned above, the first split-ring sealing member 17 is a close running fit within the groove 15 in the shaft, to give a minimum clearance leakage path, but the second split-ring sealing member 18 has a lesser axial width than the first split-ring sealing member 17, the assembly being such that neither the first nor the second split-ring sealing members rotate with the shaft. However, the first split-ring sealing member 17 will follow small axial perturbations of the shaft 10 relative to the housing 12, whilst at all times covering the gap (not shown) in the second split-ring sealing member 18, the second split-ring sealing member serving to effect a seal to the housing.

When in use, the seal assembly is subjected to gas pressure from the turbo-charger through clearance 13, but to oil pressure through the clearance 13a is found that the described seal assembly provides an improved form of seal, giving reduced leakages of fluid thereacross.

Figure 2:
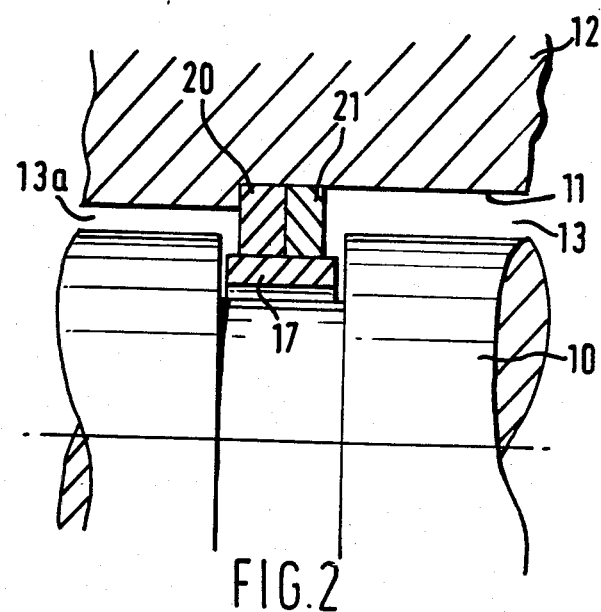
FIG. 2 is a view similar to that of FIG. 1, but showing an alternative form of seal assembly of this invention.

FIG. 2 shows an alternative form of seal assembly of this invention, and parts similar to those illustrated in FIG. 1 are given like reference characters; such parts will not be described again here. In the seal assembly of FIG. 2, the single second split-ring sealing member 18 (FIG. 1) is replaced by two split-ring sealing members 20 and 21 disposed side-by-side, such that the combined width of the two second sealing members 20 and 21 is comparable to the axial width of the single sealing member 18 of the assembly illustrated in FIG. 1. It is of course possible to provide yet further second split-ring sealing members side-by-side, provided that the overall combined axial width is still less than the axial width of the first split-ring seal member 17. With such an arrangement, the gap of one second sealing member 20 is unlikely to be aligned with the gap of the or each further second sealing member, thereby further reducing the likelihood of the leakage of fluid through the seal assembly.

Figure 3:
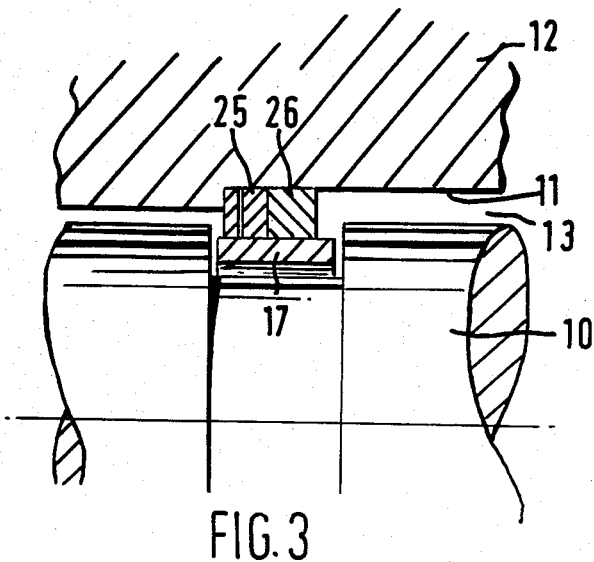
FIG. 3 is a view of a yet further alternative form of seal assembly of this invention.

FIG. 3 shows a further alternative seal assembly of this invention, and parts similar to those illustrated in FIG. 2 are given like reference characters. In the assembly of FIG. 3, the two second split-ring sealing members 20 and 21 (FIG. 2) are replaced by split-ring sealing members 25 and 26 each of the step-gap type, so as further to reduce the likelihood of leakage across the seal assembly.

Figure 4:
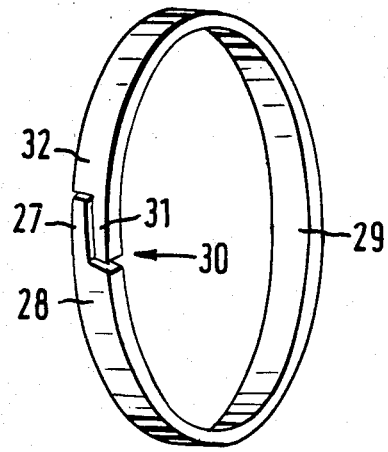
FIG. 4 is a perspective view of a step-gap type of sealing member suitable for use in a seal assembly of this invention.

FIG. 4 illustrates the step-gap type of sealing members used in the seal assembly of FIG. 3, and from this FIG. 4 it can be seen that a portion 27 of one end 28 of the ring 29 to one side of the gap 30 has a reduced axial width, the portion 31 of the end 32 to the other side of the gap 30 also having a reduced axial width but in a complementary sense, such that the two reduced portions 27 and 31 may overlie each other, side-by-side. It will be appreciated that a gap 30 having this particular configuration will serve to enhance the fluid sealing characteristics of the ring.

I claim:

1. A seal assembly for a shaft extending through a bore in a housing and adapted for rotation at very high rates, which sealing assembly comprises an annular groove formed around a part of the shaft which lies within the bore in the housing, a first resilient split-ring sealing member located within said groove and tending to spring outwardly free of the groove, and at least one second resilient split-ring sealing member of lesser ovall axial width than the first sealing member, the second sealing member being located partially within said groove so as to overlie and be engaged by said first split-ring sealing member, the at least one second split-ring sealing member also tending to spring outwardly and bearing against a wall of said bore defined by the housing with a sufficient force to restrain rotation of said at least one second sealing member so as to thereby to effect a seal against said housing, the rotation of said first sealing member being restrained by virtue of the engagement thereof with the at least one second sealing member, said first sealing member being free to slide axially with respect to said at least one second sealing member thereby to be able to follow minor axial shaft movements whilst still effecting a seal therewith.

2. A seal assembly according to claim 1, in which at least one of said first and second split-ring sealing members is of the step-gap type, in which an end portion of the ring member to one side of the split-gap lies axially alongside an end portion of the ring member to the other side of the split-gap.

3. A seal assembly according to claim 1, in which two second split-ring sealing members are provided in an axial side-by-side disposition, each said second split-ring sealing member being engaged by said first split-ring sealing member.

4. A seal assembly according to claim 1, in which the axial width of said first split-ring sealing member is selected to be a close running fit between the side walls of said groove in the shaft.

5. A seal assembly according to claim 4, in which said first split-ring sealing member has a lesser radial width than that of the or each second split-ring sealing member.

6. A seal assembly for a shaft extending through a stepped bore in a housing and adapted for rotation at very high rates, which sealing assembly comprises an annular groove formed around a part of the shaft which lies within the bore in the housing, a first resilient split-ring sealing member having a rectangular radial cross section and located within said groove and tending to spring outwardly free of the groove, the first split-ring sealing member having an axial width to be a close running fit between a side wall of the groove and a radial dimension smaller than the radial depth of the groove, and at least one second resilient split-ring sealing member of lesser overall axial width than the first sealing member, the second sealing member having a rectangular cross-section and being located partially within said groove but of a lesser axial width than said first sealing member, the second sealing member overlying and being engaged by said first split-ring sealing member and also tending to spring outwardly and bearing against a wall of said bore defined by the housing and against the step in said bore, with a sufficient force to restrain rotation of said at least one second sealing member so as to thereby to effect a seal against said housing, the rotation of said first sealing member being restrained by virtue of the engagement thereof with the at least one second sealing member, said first sealing member being free to slide axially with respect to said at least one second sealing member thereby to be able to follow minor axial shaft movements whilst still effecting a seal therewith.

* * * * *